June 14, 1932.  C. RINGWALD  1,862,806
STARTER DRIVE
Filed Feb. 6, 1928  3 Sheets-Sheet 1
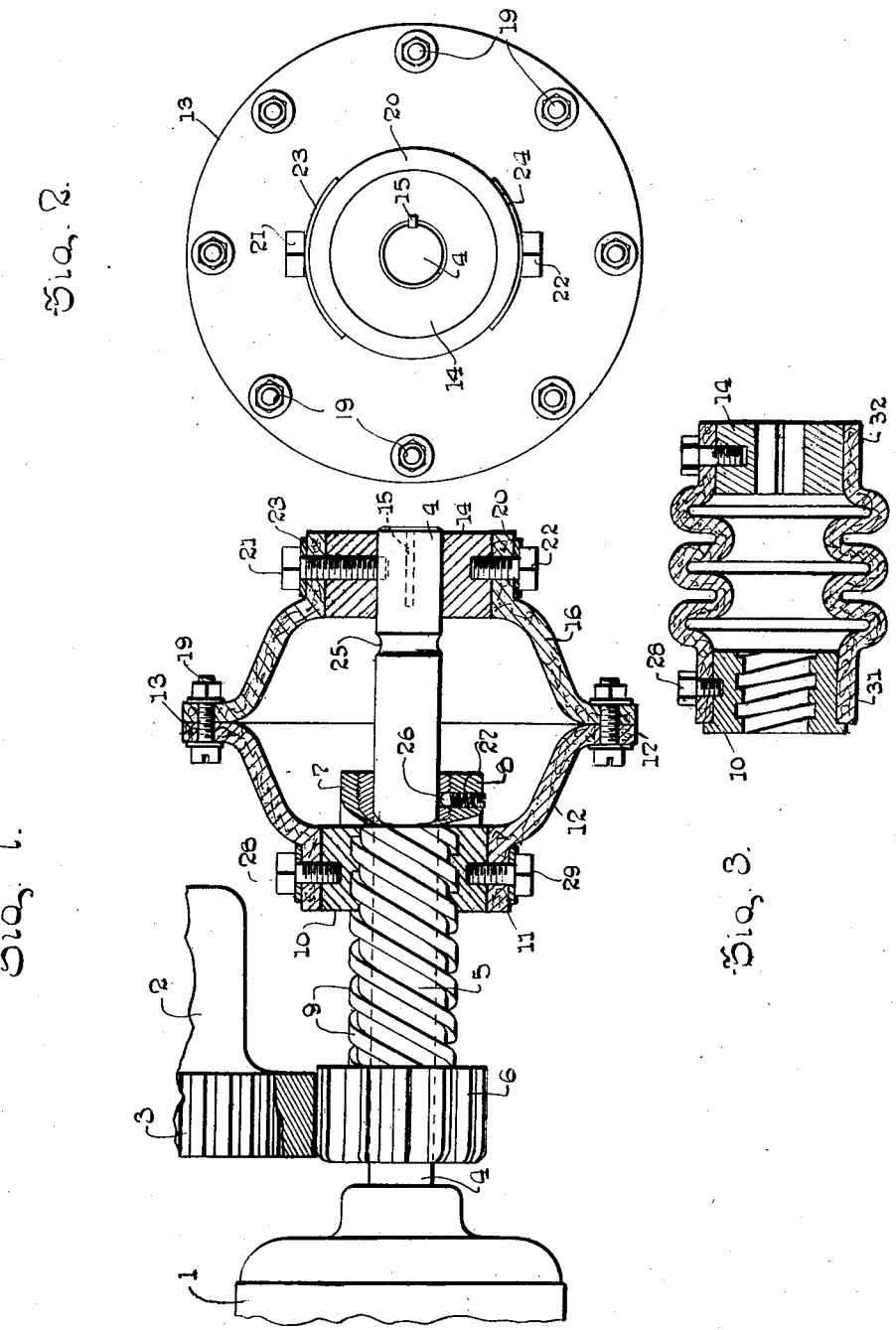
Inventor
Clarence Ringwald

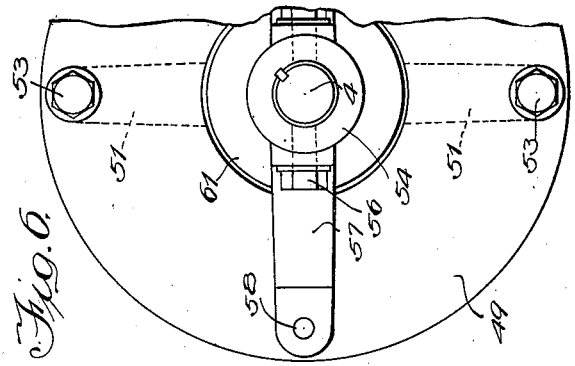
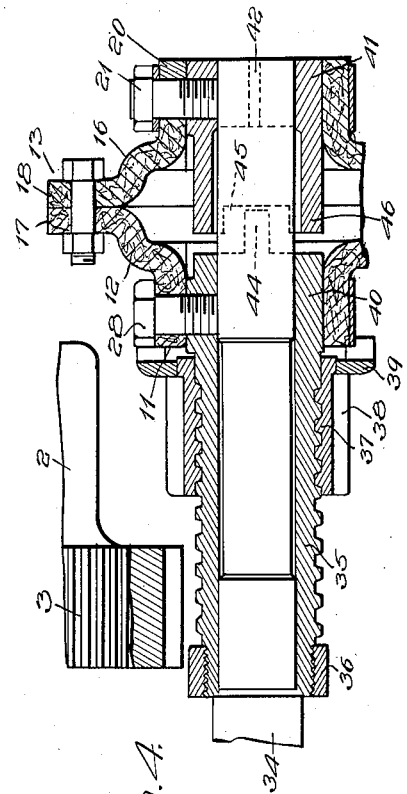
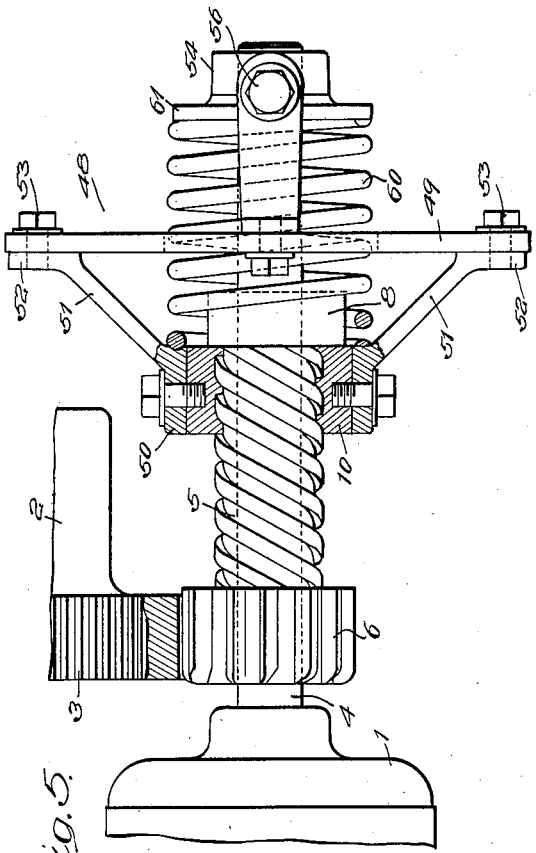

June 14, 1932. C. RINGWALD 1,862,806
STARTER DRIVE
Filed Feb. 6, 1928 3 Sheets-Sheet 3
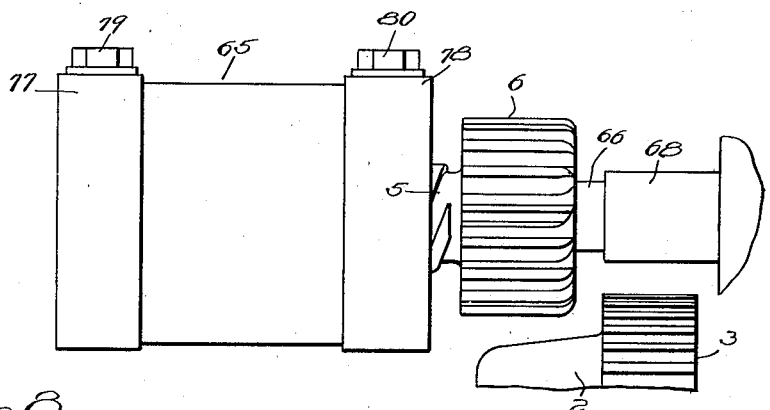
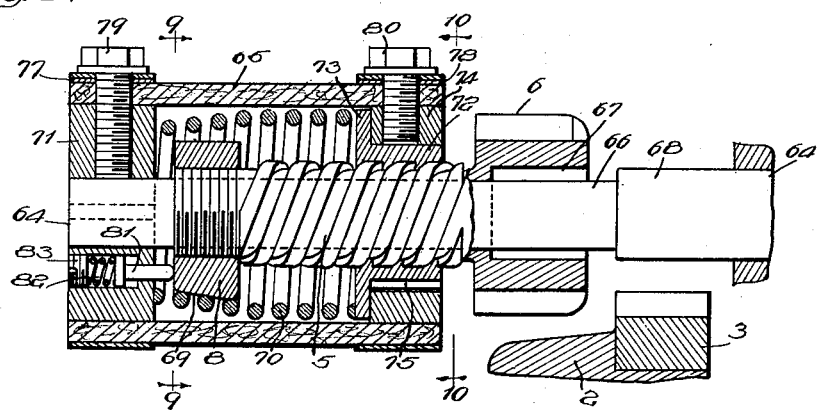
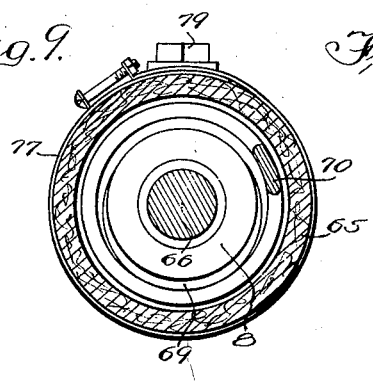
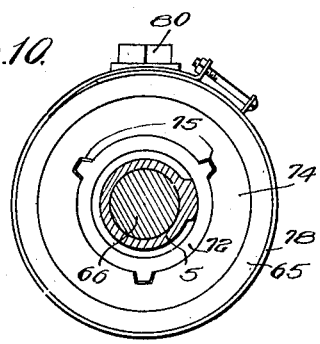
Inventor:
Clarence Ringwald Patented June 14, 1932

1,862,806

UNITED STATES PATENT OFFICE

CLARENCE RINGWALD, OF SOUTH BEND, INDIANA, ASSIGNOR, BY DIRECT AND MESNE ASSIGNMENTS, TO ECLIPSE MACHINE COMPANY, OF ELMIRA HEIGHTS, NEW YORK, A CORPORATION OF NEW YORK

STARTER DRIVE

Application filed February 6, 1928. Serial No. 252,284.

My invention relates to drives for engine starters and constitutes an improvement upon the device disclosed in my prior Patents Nos. 1,597,330 and 1,634,515, as well as a general improvement in starters of this class.

Starters as heretofore constructed have relied upon a helical spring acting in torsion to relieve the shock of engagement of the pinion with the fly wheel gear or ring gear and in compression for providing sufficient endwise yield to permit a tooth of the pinion to pass a tooth of the gear in case of accidental clash endwise.

I find that the spring may be entirely dispensed with by the provision of an element which has a limited flexibility and not only will such elements permit the spring to be dispensed with but a smooth quiet operation superior to that of known devices is secured. The flexible element may be used in series with the spring to relieve it of the excessive stresses which it would otherwise encounter and thereby prevent breakage, in addition to quieting the operation of the device, but generally this element secures the desired function without the use of the spring.

If desired the flexible element may be backed up by a spring which is subjected only to endwise compression or extension but this is not essential particularly in the form of device wherein the flexible element has a wall extending radially outwardly sufficiently to permit of an endwise flexibility in addition to the peripheral yield.

Now in order to acquaint those skilled in the art with the manner of constructing and operating a device embodying my invention, I shall describe in connection with the accompanying drawings a specific embodiment of the same.

In the drawings:

Fig. 1 is a longitudinal cross sectional view of the preferred form of my invention;

Fig. 2 is an end elevational view of the same;

Fig. 3 is a longitudinal sectional view showing a modified form of coupling having a plurality of corrugations in the walls thereof;

Fig. 4 is a longitudinal sectional view of a modified form of device on which the pinion teeth are formed on the threaded nut member instead of on the threaded sleeve member as shown in Figs. 1, 2 and 3;

Fig. 5 is a side view partly in section and

Fig. 6 is a partial end view of a modified embodiment of my invention;

Fig. 7 is a side elevational view and

Fig. 8 a longitudinal sectional view of a further modification of my invention;

Fig. 9 is a section taken on the line 9—9 of Fig. 8 and

Fig. 10 is a similar section taken on the line 10—10 of Fig. 8.

Referring now to Fig. 1, the driving motor is indicated at 1 and the fly wheel of the internal combustion engine is shown at 2. It bears a ring gear 3 adapted to be driven through the starter drive by the electric motor 1. The motor 1 has a driving shaft 4 upon which there is slidably and rotatably mounted a sleeve 5 having an integral pinion at its forward end and having a stop collar 7 at the remote end. This stop collar 7 is preferably unbalanced by a mass of metal at one side as indicated at 8 for the dual purpose of increasing the inertia thereof and also for holding the sleeve and pinion in a predetermined position when the drive is out of use. The collar 7 is threaded upon the end of the sleeve 5 by means of a fine pitched screw thread facing or leading in the opposite direction from the screw threads 9 formed on the sleeve 5.

A threaded nut 10 fits the threads 9 on the sleeve 5. It has secured thereto the hub 11 of a cup-shaped member 12 which forms a part of the coupling 13 between the threaded nut 10 and the shaft collar 14 which is keyed as indicated at 15 to the outer end of the motor shaft 4.

The coupling 13 is formed of two cup-shaped members such as 12 and 16, substantially indentical in form and construction, these cup-shaped members 12 and 16 having outer depending flanges 17 and 18 at the rims thereof adapted to be bolted together by the clamping bolts 19.

The member 16 likewise has a hub 20 corresponding to the hub 11 of the member 12 and in the preferred embodiment of the invention, these hub members are vulcanized to the nut 10 and the shaft collar 14, respectively. These cup-shaped members 12 and 16 are preferably formed of a cotton fabric impregnated with rubber, like rubber belting. The hubs 11 and 20 may further be connected to the collars 10 and 14 by means of clamps and the like. I have shown in the collar 14 a pair of bolts 21 and 22 bearing against curve clamps 23 and 24 and extending into the shaft collar 14. The bolt 21, in addition to its function of keying the hub 20 to the collar 14 and clamping these parts together, is extended into the recess in the end of the shaft 4 for the purpose of assisting in keying these parts together.

The shaft 4 adjacent the shaft collar 14 is provided with a shallow groove 25 which has been shown as of exaggerated depth in Fig. 1 and the eccentric collar 8 on the end of the sleeve 5 is provided with a spring pressed plunger 26 in this case shown as a steel ball pressed radially inwardly by spring 27. When the sleeve 5 is thrown backward or rejected by the fly wheel gear 3 the spring plunger 26 is adapted to drop into the groove 25 and prevent the sleeve from accidentally travelling forward as by rattling or by rebound as might otherwise occur.

The operation of the device shown in Figs. 1 and 2 is as follows:

Assume that the parts are in the position shown and the motor 1 is driving the fly wheel 2. As soon as the engine begins to operate on its own power it tends to drive the pinion 6 faster than it is driven by the motor with the result that the sleeve 5 is driven faster than the shaft 4. This will result in movement of the sleeve 5 endwise in the threaded nut 10 until the collar 7 engages the shaft collar 14. If the movement of the sleeve 5 is relatively violent the engagement of the eccentric collar 7 with the shaft collar 14 will tend to put the coupling 13 under tension just as the spring is under tension in my prior Patent No. 1,634,515. The groove 25 and plunger 26 may be omitted if desired but they are desirable to prevent accidental travel of the sleeve 5 as by vibration or motion of the automobile on the road or due to vibration of the engine. At all events the coupling 13 forms a yielding takeup for stopping the motion of the sleeve 5 and pinion 6 without jamming of the parts together in such a way that they will not readily function on the next starting operation.

Assuming that the shaft 5 and its connected parts have been moved to the right as viewed in Fig. 1 and that the starter is to be employed for starting the engine. The motor shaft 4 starts under the torque of the motor 1 and due to the relatively low pressure between the sleeve 5 and the shaft 4 and connecting parts the coupling 13 turns the nut 10 faster than the sleeve 5 will turn with it, with the result that the sleeve 5 is caused to travel endwise and it may at the same time acquire some angular motion. As soon as the teeth of the pinion 6 engage the teeth of the fly wheel or ring gear 3 rotary motion of the sleeve 5 is temporarily stopped. If the teeth of the gears 6 and 3 mesh instantly the pinion 6 continues its endwise travel without interruption and as soon as the eccentric collar 7 engages the threaded nut 10 the sleeve 5 is then coupled to said nut 10 and the entire torque of the shaft 4 is then transmitted through the coupling 13 to the pinion 6. The coupling 13 has sufficient angular yield to prevent damage to the teeth of either gears 6 or 3 and yet to transmit a padded blow to the fly wheel 2 to break it loose and start it in rotary motion.

There is a limited amount of angular yield in the coupling 13 which is desirable, first to prevent too rigid a coupling between the shaft 4 and the pinion 6 which might result in breakage of the part and second to limit the sudden draft of current from the battery operating the motor 1 when the drive is finally in mesh and starts to drive the fly wheel 2.

Assume that during the operation of moving the sleeve 5 to the left as viewed in Fig. 1 the teeth of pinion 6 clash with the teeth of the gear 3, that is to say instead of meshing endwise they abut endwise so that axial motion is temporarily stopped. The shaft 4 continues to revolve and due to the threads on the sleeve 5 and in the nut 10 such continued rotation results in a thrust of the pinion and sleeve to the left and a reactionary thrust on the threaded nut 10 to the right as viewed in Fig. 1. This reactionary thrust on the threaded nut 10 results in a compression of the coupling 13 which coupling due to the shape of the parts 12 and 16 is capable of yieldingly sustaining a thrust endwise until such time as the pinion 6 is moved sufficiently with respect to the ring gear 3 as to bring the teeth in alignment for meshing whereupon the yield in the coupling 13 by the resiliency of the parts 12 and 16 shoots the pinion 6 immediately into mesh with the gear 3 and the complete meshing and final rotary drive of the pinion 6 thereby results.

It is to be observed that the resiliency of the coupling 13 is not dependent upon its pneumatic properties although these may be taken advantage of. In the preferred form, I depend upon the tendency of the couplings 12 to restore themselves to their normal form as shown in Fig. 1 after endwise compression or angular displacement.

In the form shown in Fig. 4 the pneumatic effect of the trapped body of air may be employed in addition to the resiliency of the coupling 13 to thrust the pinion endwise.

In Fig. 3 I have shown a coupling 30 which is preferably made in the form of a corrugated cylinder. The plain cylindrical ends 31 and 32 correspond to the hubs 11 and 20 in Fig. 1 and are secured to the nut 10' and a collar 14' respectively as in Fig. 1.

It is to be understood that the corrugated walls of the coupling 30, like the single corrugation produced by the flanged cup members 12 and 16 in Fig. 1, permit of endwise compression and a certain degree of angular flexibility for deadening the shocks of endwise engagement and to shoot the pinion 6 into mesh after clashing of the gears where such occurs also to pad the blow of rotary drive when the collar 7 engages the nut 10.

For purpose of ease in assembly, the nut 10' may be divided into two parts suitably keyed together for angular motion and pinned as by means of the bolt 28 against endwise motion.

In Fig. 4 I have shown the coupling 13 of my invention as applied to the conventional form of drive now known in the art. In this case the motor shaft 34 has the threaded sleeve 35 loosely mounted thereupon for limited axial and rotary motion with a stop collar 36 threaded upon the end of the same for limiting the endwise motion of the threaded nut 37, which nut has the pinion teeth 38 thereupon forming the driving pinion for the ring gear 3 on the fly wheel 2. This threaded nut 37 has an eccentric collar 39 to provide a certain inertia effect and also to prevent rattling or vibration from causing the same to be threaded accidentally along the threaded sleeve 35.

At the remote or right hand end as viewed in Fig. 4, the sleeve 35 has an enlarged collar 40 formed thereupon and this collar receives the hub member 11 of the coupling 13. At the right hand end of the shaft 34 a driving collar 41, corresponding to the collar 14 in Fig. 1, is keyed to the shaft as by means of the key 42 and the said collar has vulcanized thereto a hub 20 of the coupling 13. The hub 20 and the collar 41 are also held in engagement, if desired, by means of the screws 21 as in Fig. 1, and a hub 11 of the coupling portion 12 is likewise preferably vulcanized to the hub 40 of the sleeve 35 or to a separate sleeve which may be keyed to the hub 40 of the sleeve 35 and the part held in engagement by the screw 28 as in the case of Fig. 1.

The operation of this form of the device is substantially identical with that described in connection with Figs. 1 and 2. It is to be observed, however, in this case that the sleeve 35 does not bear the pinion teeth, but the threaded nut 37 bears the same and, hence, upon starting the motor the shaft 34 rotates the sleeve 35 and the threaded nut 37 does not immediately acquire the angular velocity of the shaft, with the result that it is threaded endwise to cause the teeth 38 to mesh with the teeth of the ring gear 3, as is well known in the art.

I have shown the sleeve 35 as provided with a limiting projection 44 lying in a notch 45 in the extended part 46 of the collar 41, so as to limit the rotary play which can be secured through the coupling 13. Such positive limitation, as is imposed by the extension 44 and the notch 45 is not essential and may be dispensed with.

Likewise, the extension 46 approaches the collar 40 with a certain limiting gap therebetween so that the coupling 13 can be subjected to only a limited endwise displacement. Such angular and axial limiting means is not generally necessary but where the same is provided the coupling 13 may be made considerably lighter and satisfactory service secured therefrom.

Referring now to the modification shown in Fig. 5, in this case the coupling 48 between the shaft 4 and the threaded nut 10 employs a flexible fabric disc 49 preferably made of canvas impregnated with rubber or other suitable material. The threaded sleeve 5 and pinion 6 are of the same character as shown in Fig. 1. The flexible disc 49 is apertured at the center to pass the eccentric collar 8 when the pinion 6 is rejected by the fly wheel gear 3. The flexible disc 49 is connected to the threaded nut 10 by a spider comprising a hub member 50 coupled to the nut 10 and having arms, in this case shown as two arms 51 having clamping pads 52 at their outer ends secured to the disc by means of the clamping bolts and washers 53.

The shaft collar 54, which is keyed and pinned to the end of the shaft 4 as by means of the cap screw 56, likewise has a pair of arms 57 extending out to the peripheral portion of the disc 49 and clamped there by clamping screws 58 as in the case of the arms 51. The arms 57 are disposed substantially equal distance between the arms 51 and, while I have shown only two arms, it is apparent three or more might be used depending upon the rigidity or flexibility of the disc 49.

The resiliency of the disc 49 may be great enough to accomplish the desired object of padding the angular blow delivered through the drive to the fly wheel gear 3 and of permitting sufficient endwise yield to permit the pinion 6 to be stopped upon clashing of the pinion 6 with the gear 3 and then to snap the pinion into mesh by continued rotary motion of the shaft 4, as above described.

If desired, a compression spring 60 may be disposed between the two parts of the coupling as, for example, between a flange 61 on the collar 54 and a hub 50 of the spider member on the left of the disc 49. Such spring 60 tends normally to flex the disc 49 in the opposite direction from that in which it will be flexed by endwise thrust of the threaded sleeve 5 in case of clashing of the pinion with the gear. This spring, therefore, provides a slightly greater range of motion of the parts and adds a certain amount of resiliency to the flexible disc 49.

The spring 60 is not essential and may be dispensed with by suitably proportioning the character of a disc 49 and its connected spiders.

In the embodiment shown in Figs. 7 to 10, the coupling 65 comprises a cotton fabric sleeve impregnated with rubber between the motor shaft 64 and the pinion 6. In this case the motor shaft 64 has a reduced portion 66 upon which the threaded sleeve 5 is adapted to move and the pinion 6 is recessed as indicated at 67 to bear upon the portion 68 of the motor shaft 64.

By this arrangement of the stepped shaft and the recessed pinion, the diameter of the pinion may be made a minimum so that a maximum driving ratio between the shaft 64 and the ring gear 3 may be obtained.

The rear end of the threaded sleeve 5 is provided with an eccentric collar 8 which, however, has an inclined surface 69 for engaging with the coil of a compression spring 70.

The shaft 64, at its outer end, is keyed to the shaft collar 71. A threaded nut 72 is mounted on the threads of the threaded sleeve 5 and it has a flange 73 extending out radially from the inner edge of the nut 72. A collar 74 is splined to the nut 72 as by means of a key 75, shown in Fig. 10 so that these two parts 74 and 72 may have a limited axial motion with respect to each other.

The two parts are held normally in engagement, that is, the flange 73 rests against the ring 74 under the endwise pressure of the spring 70, the opposite ends of the spring 70 bearing against the shaft collar 71.

The flexible coupling 65, which comprises a cylinder of fabric impregnated with rubber like a piece of rubber hose is secured at one end to the shaft collar 71 and at the opposite end to the threaded nut through the collar 74. The threaded nut may be considered as made in two parts 72 and 74, although they are unitary so far as angular drive is concerned. The flexible coupling 65 comprises clamps 77 and 78 for clamping the ends of the rubber hose to the collars 71 and 74 respectively, although it will be apparent that these parts may be vulcanized together. Cap screws, such as 79 and 80, may be inserted through the clamps 77 and 78 to pin a section of hose to the respective collars.

The operation of the device is as follows:

Assume that the parts are in the position shown in Figs. 7 and 8 and that the shaft begins to rotate in a counterclockwise direction, as viewed from the right of Figs. 7 and 8 to advance the pinion 6 along the shaft 64 to engage the ring gear 3. As soon as the pinion 6 engages the gear 3 it will either proceed immediately to mesh or the teeth will clash and in the event of the latter, further rotation of the shaft 64 causes an endwise pressure of the nut 72 against the threads of the threaded sleeve 5, the reaction of this thrust being taken up by the compression spring 70 which is provided for the purpose. Thereupon further rotation tends to bring the teeth of the pinion 6 into register with the teeth of the pinion 3 whereupon the pinion 6 is shot into mesh and is continued to advance onto the portion 68 of the shaft 64 until the eccentric collar 8 engages the nut 72 whereupon the drive proceeds to rotary motion only. Thereupon the shock of taking up the motion of the shaft 64 through the pinion 6 is cushioned by the coupling 65.

I have found, by experimenting with this type of drive, that the interposition of this flexible coupling provides an unusually smooth and silent meshing and drive not obtainable in prior devices of the prior art.

As soon as the engine starts, the pinion 6 is rotated with respect to the shaft 64 in a direction which projects the pinion and sleeve to the left as viewed in Fig. 8, whereupon as the pinion disengages the gear the eccentric collar 8 along its inclined surface 69 begins to engage the coils of the compression spring 70 to stop the motion of the pinion and to prevent rebound. If desired, the motion of the sleeve and pinion may be stopped by a spring plunger 81 mounted in the collar member 71 on the shaft 64. This plunger is urged inwardly by a coil spring 82 held by plug 83 in a recess in the shaft collar 71. Such coil spring and plunger tends frictionally to hold the sleeve 5 and prevent travel of the same by vibration or shaking but also to take up the shock of the rejection of the pinion 6 and to prevent endwise rebound from the shaft collar 71.

If desired, the compression spring 70 may be dispensed with and the nut and ring 72, 74 be coupled together or joined integrally, dependence being had upon the slight degree of endwise flexibility of the coupling 65 to permit the meshing of the pinion 6 with the ring gear 3 in case of endwise clashing of the teeth.

I do not intend to be limited to the details shown and described.

I claim:

1. In a starter for internal combustion engines the combination of a starter shaft, a threaded sleeve member and a threaded nut member, one of said members having pinion teeth thereon for engagement with a member of the engine to be started, and the other member being adapted to be driven from the starter shaft, a pair of cup-shaped, flexible elements adapted to be connected between said other member and the shaft, said elements having limited endwise and rotary flexibility and having flanges about their rims and means for connecting said flanges.

2. As an article of manufacture a cup-shaped element of fabric impregnated with rubber and having a flange about the rim thereof the bottom of the cup having an axially extending hollow hub and a metal ring in the hub vulcanized thereto.

3. In combination a driving shaft, a threaded sleeve on the shaft, said sleeve having a driving pinion at one end and a collar at the other, a nut on the threaded sleeve, a collar on the end of the shaft and a flexible coupling of fabric connecting said shaft collar and said nut, said coupling comprising a pair of flanged cup-shaped members having their flanges bolted together and having their opposite ends connected to said shaft collar and to said nut.

4. In combination, a driving shaft, a threaded sleeve slidably mounted on said shaft, a nut threaded thereon, one of said threaded members having a driving pinion thereon, a collar on said shaft and a flexible fabric coupling connecting said shaft collar to the other threaded member comprising a pair of flanged cup-shaped members having their flanges fixed together, and having their opposite ends connected to said shaft collar and said other threaded member, and means for yieldably retaining said threaded sleeve in a retracted position on said shaft.

In witness whereof, I hereunto subscribe my name this 31st day of January, 1928.

CLARENCE RINGWALD.